Patented June 21, 1938

2,121,036

UNITED STATES PATENT OFFICE 2,121,036

METHOD OF PLUGGING POROUS STRATA IN WELLS

Carroll Irons, Midland, Mich., assignor to The Dow Chemical Company, Midland, Mich., a corporation of Michigan No Drawing. Application October 31, 1936, Serial No. 108,592

7 Claims. (Cl. 166—21)

The invention relates to the treatment of wells such as those yielding water, oil, or gas. It particularly concerns an improved method of reducing the permeability of porous, non-productive formations in a well.

The presence in the earth or rock traversed by the well bore of permeable strata which are not productive of oil or gas often causes difficulty in the profitable operation of wells, for example, oil and gas wells, and interferes with their treatment with fluid agents to increase the production or to otherwise alter the characteristics of the well. As an illustration, a permeable stratum may permit the entrance of ground waters or brine into the well, causing corrosion of equipment, the formation of emulsions, additional pumping expense, and the problem of disposal. In some cases the invasion of the producing formation by water or brine entirely prevents the recovery of oil or gas.

In the acidizing or other treatment with a fluid agent of a well penetrating a porous but non-productive stratum, the porous rock may absorb large quantities of the treating agent, thus causing a loss of agent, unnecessarily increasing the expense of the treatment. Similarly, when it is attempted to employ a conventional "flooding" or "fluid drive" process of recovering the oil, the flooding agent or driving fluid may by-pass the oil-bearing rock and pass through the permeable but non-productive pores instead without accomplishing the intended result. Water wells drilled into a fresh water-bearing stratum contiguous to a brine-bearing stratum may become contaminated with brine due to gradual leakage of the brine into the water-bearing stratum. In such cases it is desirable to be able to shut off the flow of brine without affecting the normal flow of water to the well.

The principal object of the invention is to provide a method of reducing the permeability or porosity of the permeable strata in the geological formation surrounding a deep well. A particular object is to reduce the permeability of water- or brine-bearing formations leading to the bore of an oil or gas well, whereby the flow of water or brine into the well may be materially decreased, if not entirely prevented. Other objects and advantages will be apparent as the description proceeds. To the accomplishment of the foregoing and related ends, the invention, then, consists of the method of reducing the permeability of permeable earth or rock hereinafter fully described and particularly pointed out in the claims.

I have now discovered that the foregoing and related objects are attained by introducing into the well and thence into the formation an aqueous latex coagulable by contact with a suitable coagulant, but not by contact with oil or fresh water. As an illustration of my invention I have found that rubber latex is particularly effective to form a sealing deposit in permeable earth or rock formations when brought into contact therein with a brine containing in solution either calcium or magnesium salts. The brine encountered in oil and gas wells usually contains a sufficient concentration of either calcium or magnesium salts to effect the coagulation of latex. On contacting such brine in the pores of the formation the latex coagulates producing rubber masses which adhere to the walls of the pores or fissures of the formation, effectively sealing them against fluid flow. The deposit or coagulum is highly water-repellent and the particles thereof coagulate and agglomerate readily into rubber-like masses which adhere to the walls of the pores of the rock so strongly as to resist displacement even when subject to enormous pressure. The coagulum also has a consolidating action upon relatively loose earth formations and is effective, therefore, for consolidating loose or caving earth formations, when deposited therein.

In the treatment of oil wells penetrating brine-bearing formations, the latex on being injected into the formation is coagulated into a rubber mass in the brine-bearing stratum, but no substantial effect occurs in the oil-bearing stratum should any of the latex penetrate therein. The oil-bearing passages not containing brine will, therefore, remain free and open. Latex has a selective action not only in the case of formations yielding both brine and oil, but also in formations yielding brine and water, since coagulation and deposition of the pore sealing deposit occurs only in the presence of brine or a suitable coagulant and not in the presence of either oil or fresh water.

As an illustration of a mode of carrying out the invention in an oil well yielding brine, the well is first treated to remove brine in the bore and preferably also from the face of the formation. This may be accomplished by circulating oil down the tubing and up the casing, or vice versa, while maintaining sufficient pressure on the well to prevent inflow of brine. Fresh water then may be introduced while the well is still under pressure, so as to force the brine back into the formation, thus removing the brine from the face of the formation. The latex is then injected into the bore, pressure being applied, if necessary, so as to force the latex into the formation and to bring it into contact with the brine therein. In some wells where the brine is deficient in salts which bring about coagulation of the latex, it is necessary to inject a quantity of alkaline earth metal salt brine or other suitable coagulant and to force the coagulant back into the formation preferably after injecting the latex. After the latex is injected into the formation and commingled with coagulant or brine therein, the pressure may be released and the well allowed to produce. The coagulum which is produced effectively seals off brine from re-entering the well.

Various concentrations of latex are effective. For example, rubber latex may be used in the concentration in which it is obtained from the rubber tree, or in the more concentrated forms produced by centrifuging natural latex, or in diluted condition. The concentration of latex, as it is produced, is from about 10 to 50 per cent of rubber, the usual concentration being between 30 and 40 per cent, and diluted latex is readily obtainable which contains from 15 to 25 per cent of rubber. These and other concentrations are effective for the purpose. For example, I have found that diluted rubber latex containing about 1 per cent of rubber is effective.

In order to prevent spontaneous coagulation of the natural or diluted latex in shipment or during storage, it is the usual practice to add to the raw latex a relatively small amount of sodium sulphide, ammonia, or caustic soda, as these agents will preserve the latex in its natural uncoagulated condition for many months. The presence of such substances, however, does not interfere with the action of suitable coagulants. Suitable coagulants, besides those already mentioned, are the weak acids such as acetic acid, formic acid, and sodium silico-fluoride, sulphuric acid, alum, an aqueous solutions of the soluble alkaline earth metal salts. Many other agents are also known to coagulate rubber latex. In some instances it is desirable to have present in the latex prior to injection into the formation an agent which has a preserving or disinfecting action on the coagulum resulting from its contact with the coagulant. For example, a relatively small amount of para-nitro-phenol may be used which will prevent the coagulated latex from moulding or otherwise decomposing in time.

The coagulating action of the coagulant varies with the nature and the concentration thereof. It is found that fresh water, which is normally suitable for drinking purposes, although it may contain small amounts of calcium and magnesium salts, will not bring about coagulation, while brines that contain these salts in a concentration of over 1 per cent are very effective coagulants. Brines which are composed largely of sodium chloride and water are not effective coagulants. To such brines must be added calcium or magnesium salts or other suitable coagulants to bring about coagulation of rubber latex.

The foregoing method is particularly advantageous in the treatment of brine-bearing formations contiguous to an oil or gas producing formation in a deep well, wherein it is desired to shut off such brine without affecting the flow of oil or gas to the well.

The method may be employed advantageously in connection with fluid drive operations in which the residual oil in an earth formation is driven or washed to a recovery well by injecting a gas or water into the formation through an input well in the formation. If the driving fluid tends to by-pass the oil-containing portion of the formation, when employing a gas, for example, as a driving fluid, a quantity of latex may be introduced into the input well and then forced into the formation with water and then a quantity of coagulant is introduced and forced into the formation to commingle with the latex, thereby forming a coagulum of rubber-like material in the more porous portions of the formation. The coagulum acts to seal the passages of the more porous portions of the formation, so that when the fluid drive operation is continued, the driving fluid, instead of entering the more porous portions, may be put under sufficient pressure to enter the oil-containing portions without by-passing through the more porous portions.

The coagulum obtained possesses tensile strength enabling it to hold earth particles together with greater cementing effect than the so-called chemical methods of producing a solidifying action in earth formations into which solutions are introduced forming a water-insoluble inorganic precipitate in situ. Instead of being composed of crystalline or amorphous loosely adherent masses, as are the inorganic precipitates heretofore proposed, the coagulum in my process becomes a substantially continuous phase of elastic material permeating the interstices of the earth particles and strongly cementing them together. The formation thus treated becomes a substantially continuous cemented mass far more resistant to disruption and erosion by fluids than one in which consolidation has been attempted by means of the inorganic type of precipitates.

Other modes of applying the principle of my invention may be employed instead of those explained, change being made as regards the method herein disclosed, provided the step or steps stated by any of the following claims or the equivalent of such stated step or steps be employed.

I heretofore particularly point out and distinctly claim as my invention:—

1. In a method of treating an earth formation containing an alkaline earth metal salt brine which formation is penetrated by a well bore, the step which consists in introducing into the well bore and thence into the formation rubber latex whereby the latex is coagulated on contacting the brine, forming a rubber coagulum in the brine-bearing passages of the formation.

2. In a method of treating an earth formation penetrated by a well bore, the steps which consist in injecting into the well bore and thence into the formation a latex capable of forming a rubber-like coagulum, and then an agent capable of coagulating such latex.

3. In a method of treating an earth formation penetrated by a well bore, the steps which consist in injecting into the well bore and thence into the formation a quantity of water, a latex capable of forming a rubber-like coagulum, and then an agent capable of coagulating such latex.

4. In a method of treating a porous earth formation containing an alkaline earth metal salt brine and penetrated by a well bore, the steps which consist in injecting into the well and thence into the formation rubber latex capable of being coagulated into a rubber-like mass on contacting the brine in the formation.

5. In a method of treating a porous earth formation containing an alkaline metal salt brine and penetrated by a well bore, the steps which consist in injecting into the well and thence into the formation a quantity of fresh water and then rubber latex, forming a rubber coagulum on contacting the brine in the formation.

6. In a method of shutting off brine in an earth formation penetrated by an oil well, the step which consists in bringing rubber latex into contact with the brine in the formation.

7. In a method of shutting off brine in an oil or gas well penetrating a formation yielding an alkaline earth metal salt brine, the steps which consist in circulating oil in the well, whereby brine in the well bore is displaced, and then introducing rubber latex into the well and thence into the formation, whereby the latex is coagulated by the brine into a rubber-like mass sealing the brine-bearing pores of the formation.

CARROLL IRONS.